(12) United States Patent
Miller, IV et al.

(10) Patent No.: US 11,571,866 B2
(45) Date of Patent: Feb. 7, 2023

(54) MANUFACTURING PROCESS FOR PAPERMAKING ENDLESS BELTS USING 3D PRINTING TECHNOLOGY

(71) Applicant: STRUCTURED I, LLC, Great Neck, NY (US)

(72) Inventors: Byrd Tyler Miller, IV, Easley, SC (US); Taras Z. Andrukh, Greenville, SC (US); James E. Sealey, II, Belton, SC (US); Guy Menchik, Raanana (IL)

(73) Assignee: STRUCTURED I, LLC, Great Neck, NY (US)

( * ) Notice: Subject to any disclaimer, the term of this patent is extended or adjusted under 35 U.S.C. 154(b) by 678 days.

(21) Appl. No.: 16/412,873

(22) Filed: Jun. 6, 2019

(65) Prior Publication Data
US 2020/0009812 A1    Jan. 9, 2020

Related U.S. Application Data

(60) Provisional application No. 62/671,696, filed on May 15, 2018.

(51) Int. Cl.
*B29C 64/10* (2017.01)
*B29C 64/112* (2017.01)
(Continued)

(52) U.S. Cl.
CPC .............. *B29D 29/00* (2013.01); *B29C 64/10* (2017.08); *B29C 64/112* (2017.08); *B29C 64/236* (2017.08); *B29C 64/241* (2017.08); *B29C 65/08* (2013.01); *B29C 65/16* (2013.01); *B29C 65/48* (2013.01); *B29C 65/4895* (2013.01); *B33Y 80/00* (2014.12); *D21F 1/0036* (2013.01);
(Continued)

(58) Field of Classification Search
CPC .... D21F 1/0027; D21F 1/0036; D21F 1/0063; D21F 1/80; D21F 3/0227; D21F 3/029; D21F 7/08; D21F 7/083; B29C 64/10; B29C 64/106; B29C 64/112; B29C 64/118; B29C 64/202; B29C 64/205; B29C 64/209; B29C 64/227; B29C 64/236; B29C 64/241; B29C 65/08; B29C 65/16; B29C 65/48; B29C 65/4895; B29D 29/00; B29L 2031/733; B32B 5/26; B33Y 10/00; B33Y 30/00; B33Y 40/00; B33Y 80/00

See application file for complete search history.

(56) References Cited

U.S. PATENT DOCUMENTS

| | | |
|---|---|---|
| 4,984,728 A | 1/1991 | Brinkmeier et al. |
| 5,128,091 A | 7/1992 | Agur et al. |
| 5,238,537 A | 8/1993 | Dutt |
| 5,943,235 A * | 8/1999 | Earl ........................ B29C 64/40 700/98 |

(Continued)

FOREIGN PATENT DOCUMENTS

| | | |
|---|---|---|
| WO | 2016/090364 A1 | 6/2016 |
| WO | 2017/139786 A1 | 8/2017 |

OTHER PUBLICATIONS

PCT International Search Report and Written Opinion dated Jul. 24, 2019 in connection with PCT/US2019/32417.

*Primary Examiner* — Michael A Tolin
(74) *Attorney, Agent, or Firm* — Amster, Rothstein & Ebenstein LLP

(57) ABSTRACT

An apparatus for producing endless 3-D printed belts using in papermaking and an apparatus for producing endless 3-D printed belts laminated to a substrate for additional strength and dimensional stability during use.

6 Claims, 3 Drawing Sheets

(51) Int. Cl.
*B29C 64/236* (2017.01)
*B29C 64/241* (2017.01)
*B29C 65/08* (2006.01)
*B29C 65/16* (2006.01)
*B29C 65/48* (2006.01)
*B29D 29/00* (2006.01)
*B33Y 80/00* (2015.01)
*D21F 1/00* (2006.01)
*D21F 3/02* (2006.01)
*D21F 7/08* (2006.01)
*B29L 31/00* (2006.01)

(52) U.S. Cl.
CPC ............ *D21F 3/0227* (2013.01); *D21F 7/083* (2013.01); *B29L 2031/733* (2013.01)

(56) References Cited

U.S. PATENT DOCUMENTS

| | | | |
|---|---|---|---|
| 6,513,897 B2* | 2/2003 | Tokie | B41J 3/546 347/15 |
| 7,169,265 B1 | 1/2007 | Kramer et al. | |
| 7,815,978 B2* | 10/2010 | Davenport | D06N 7/0092 427/508 |
| 9,352,530 B2 | 5/2016 | Hansen | |
| 9,617,077 B2 | 4/2017 | Shoji et al. | |
| 2003/0123915 A1 | 7/2003 | Klinefelter et al. | |
| 2004/0051211 A1 | 3/2004 | Mastro et al. | |
| 2005/0023719 A1* | 2/2005 | Nielsen | B29C 64/40 264/162 |
| 2005/0280184 A1* | 12/2005 | Sayers | B29C 64/40 264/308 |

* cited by examiner

MANUFACTURING PROCESS FOR PAPERMAKING ENDLESS BELTS USING 3D PRINTING TECHNOLOGY

FIELD OF THE INVENTION

This invention relates to the manufacturing process of endless belts used in papermaking processes.

BACKGROUND

Tissue papermaking is a complex process where specific control over product quality attributes is critical. Arguably, the most critical pieces of equipment used to control these quality attributes are the fabrics utilized on the papermaking machines. The various papermaking machine technologies are conventional dry crepe, through air drying (TAD), or hybrid technologies such as Metso's NTT, Georgia Pacific's ETAD, or Voith's ATMOS process. All these technologies utilize fabrics at various stages in the process to influence tissue web properties and overall asset productivity.

The predominant manufacturing method for making a tissue web is the conventional dry crepe process. The major steps of the conventional dry crepe process involve stock preparation, forming, pressing, drying, creping, calendering (optional), and reeling the web.

The first step of stock preparation involves selection, blending, mixing, and preparation of the proper ratio of wood, plant, or synthetic fibers along with chemistry and fillers that are needed in the specific tissue grade. This mixture is diluted to over 99% water in order to allow for even fiber formation when deposited from the machine headbox into the forming section. There are many types of forming sections used in conventional papermaking (inclined suction breast roll, twin wire C-wrap, twin wire S-wrap, suction forming roll, and Crescent formers) but all are designed to retain the fiber, chemical, and filler recipe while allowing the water to drain from the web. In order to accomplish this, fabrics are utilized.

Forming fabrics are woven structures that utilize monofilaments (yarns, threads) composed of synthetic polymers (usually polyethylene, polypropylene, or nylon). The forming fabric has two surfaces: the sheet side and the machine or wear side. The wear side is in contact with the elements that support and move the fabric and are thus prone to wear. To increase wear resistance and improve drainage, the wear side of the fabric has larger diameter monofilaments compared to the sheet side. The sheet side has finer yarns to promote fiber and filler retention on the fabric surface.

In order to control other properties such as: fabric stability, life potential, drainage, fiber support, and clean-ability, different weave patterns are utilized. Generally, forming fabrics are classified by the number of layers utilized in their construction. There are three basic styles of forming fabrics: single layer, double layer, and triple layer. A single layer fabric is composed of one CD (shute) and one MD (warp) yarn system. The main problem of single layer fabrics is lack of dimensional stability. The double layer forming fabric has one layer of warp yarns and two layers of shute yarns. This multilayer fabric is generally more stable and resistant to stretching. Triple layer fabrics have two separate single layer fabrics bound together by separated yarns called binders. Usually the binder fibers are placed in cross direction but also can be oriented in the machine direction. Triple layer fabrics have further increased dimensional stability, wear potential, drainage, and fiber support as compared to single or double layer fabrics.

The conventional manufacturing of forming fabrics includes the following operations: weaving, initial heat setting, seaming, final heat setting, and finishing. The fabric is made in a loom using two interlacing sets of monofilaments (or threads or yarns). The longitudinal threads are called the warp and the transverse called shute threads. After weaving, the forming fabric is heated to relieve internal stresses to enhance dimensional stability of the fabric. The next step in manufacturing is seaming. This step converts the flat woven fabric into an endless forming fabric by joining the two MD ends of the fabric. After seaming, the final heat setting is applied to stabilize and relieve the stresses in the seam area. The final step in the manufacturing process is finishing, where the fabric is cut to width and sealed.

There are several parameters and tools used to characterize the properties of the forming fabric: mesh and count, caliper, frames, plane difference, open area, air permeability, void volume and distribution, running attitude, fiber support, drainage index, and stacking. None of these parameters can be used individually to precisely predict the performance of a forming fabric on a paper machine, but together the expected performance and sheet properties can be estimated.

After web formation and drainage (to around 35% solids) in the forming section (assisted by centripetal force around the forming roll, and vacuum boxes in several former types), the web is transferred to a press fabric upon which the web is pressed between a rubber or polyurethane covered suction pressure roll and Yankee dryer. The press fabric is permeable fabric designed to uptake water from the web as it is pressed in the press section. It is composed of large monofilaments or multi-filamentous yarns, needled with fine synthetic batt fibers to form a smooth surface for even web pressing against the Yankee dryer.

After pressing the sheet, between a suction pressure roll and a steam heated cylinder (referred to as a Yankee dryer), the web is dried from up to 50% solids to up to 99% solids using the steam heated cylinder and hot air impingement from an air system (air cap or hood) installed over the steam cylinder. The sheet is then creped from the steam cylinder using a steel or ceramic doctor blade. This is a critical step in the conventional dry crepe process. The creping process greatly affects softness as the surface topography is dominated by the number and coarseness of the crepe bars (finer crepe is much smoother than coarse crepe). Some thickness and flexibility is also generated during the creping process. If the process is a wet crepe process, the web must be conveyed between dryer fabrics through steam heated after-dryer cans to dry the web to the required finished moisture content. After creping, the web is optionally calendered and reeled into a parent roll and ready for the converting process.

The through air dried (TAD) process is another manufacturing method for making a tissue web. The major steps of the through air dried process are stock preparation, forming, imprinting, thermal pre-drying, drying, creping, calendering (optional), and reeling the web. The stock preparation and forming steps are similar to conventional dry creping.

Rather than pressing and compacting the web, as is performed in conventional dry crepe, the web undergoes the steps of imprinting and thermal pre-drying. Imprinting is a step in the process where the web is transferred from a forming fabric to a structured fabric (or imprinting fabric) and subsequently pulled into the structured fabric using vacuum (referred to as imprinting or molding). This step imprints the weave pattern (or knuckle pattern) of the structured fabric into the web. This imprinting step has a tremendous effect on the softness of the web, both affecting smoothness and the bulk structure. The design parameters of the structured fabric (weave pattern, mesh, count, warp and weft monofilament diameters, caliper, air permeability, and optional over-laid polymer) are; therefore, critical to the development of web softness. The manufacturing method of an imprinting fabric is similar to a forming fabric, expect for the addition of an overlaid polymer. These type of fabrics are disclosed in patents such as U.S. Pat. Nos. 5,679,222; 4,514,345; 5,334,289; 4,528,239; and 4,637,859, the disclosures of which are hereby incorporated by reference in their entirety. Essentially, fabrics produced using these methods result in a fabric with a patterned resin applied over a woven substrate. The benefit is that resulting patterns are not limited by a woven structure and can be created in any desired shape to enable a higher level of control of the web structure and topography that dictate web quality properties.

After imprinting, the web is thermally pre-dried by moving hot air through the web while it is conveyed on the structured fabric. Thermal pre-drying can be used to dry the web to over 90% solids before it is transferred to a steam heated cylinder. The web is then transferred from the structured fabric to the steam heated cylinder though a very low intensity nip (up to 10 times less than a conventional press nip) between a solid pressure roll and the steam heated cylinder. The only portions of the web that are pressed between the pressure roll and steam cylinder rest on knuckles of the structured fabric; thereby, protecting most of the web from the light compaction that occurs in this nip. The steam cylinder and an optional air cap system, for impinging hot air, then dry the sheet to up to 99% solids during the drying stage before creping occurs. The creping step of the process again only affects the knuckle sections of the web that are in contact with the steam cylinder surface. Due to only the knuckles of the web being creped, along with the dominant surface topography being generated by the structured fabric, and the higher thickness of the TAD web, the creping process has much smaller effect on overall softness as compared to conventional dry crepe. After creping, the web is optionally calendered and reeled into a parent roll and ready for the converting process. Some TAD machines utilize fabrics (similar to dryer fabrics) to support the sheet from the crepe blade to the reel drum to aid in sheet stability and productivity. Patents which describe creped through air dried products include U.S. Pat. Nos. 3,994,771; 4,102,737; 4,529,480; and 5,510,002.

A variation of the TAD process where the sheet is not creped, but rather dried to up to 99% using thermal drying and blown off the structured fabric (using air) to be optionally calendered and reeled also exits. This process is called UCTAD or un-creped through air drying process. U.S. Pat. No. 5,607,551 describes an uncreped through air dried product.

A new process/method and paper machine system for producing tissue has been developed by the Voith GmbH (Heidenheim, Germany) and is being marketed under the name ATMOS. This process/method and paper machine system has several patented variations, but all involve the use of a structured fabric in conjunction with a belt press. The major steps of the ATMOS process and its variations are stock preparation, forming, imprinting, pressing (using a belt press), creping, calendering (optional), and reeling the web.

The stock preparation step is the same as a conventional or TAD machine would utilize. The purpose is to prepare the proper recipe of fibers, chemical polymers, and additives that are necessary for the grade of tissue being produced, and diluting this slurry to allow for proper web formation when deposited out of the machine headbox (single, double, or triple layered) to the forming surface. The forming process can utilize a twin wire former (as described in U.S. Pat. No. 7,744,726) a Crescent Former with a suction Forming Roll (as described in U.S. Pat. No. 6,821,391), or preferably a Crescent Former (as described in U.S. Pat. No. 7,387,706). The preferred former is provided a slurry from the headbox to a nip formed by a structured fabric (inner position/in contact with the forming roll) and forming fabric (outer position). The fibers from the slurry are predominately collected in the valleys (or pockets, pillows) of the structured fabric and the web is dewatered through the forming fabric. This method for forming the web results in a unique bulk structure and surface topography as described in U.S. Pat. No. 7,387,706 (FIG. 1 through FIG. 11). The fabrics separate after the forming roll with the web staying in contact with the structured fabric. At this stage, the web is already imprinted by the structured fabric, but utilization of a vacuum box on the inside of the structured fabric can facilitate further fiber penetration into the structured fabric and a deeper imprint.

The web is now transported on the structured fabric to a belt press. The belt press can have multiple configurations. The first patented belt press configurations used in conjunction with a structured fabric is U.S. Pat. No. 7,351,307 (FIG. 13), where the web is pressed against a dewatering fabric across a vacuum roll by an extended nip belt press. The press dewaters the web while protecting the areas of the sheet within the structured fabric valleys from compaction. Moisture is pressed out of the web, through the dewatering fabric, and into the vacuum roll. The press belt is permeable and allows for air to pass through the belt, web, and dewatering fabric, into the vacuum roll enhancing the moisture removal. Since both the belt and dewatering fabric are permeable, a hot air hood can be placed inside of the belt press to further enhance moisture removal as shown in FIG. 14 of U.S. Pat. No. 7,351,307. Alternately, the belt press can have a pressing device arranged within the belt which includes several press shoes, with individual actuators to control cross direction moisture profile, (see FIG. 28 in U.S. Pat. No. 7,951,269 or 8,118,979 or FIG. 20 of U.S. Pat. No. 8,440,055) or a press roll (see FIG. 29 in U.S. Pat. No. 7,951,269 or 8,118,979 or FIG. 21 of U.S. Pat. No. 8,440,055). The preferred arrangement of the belt press has the web pressed against a permeable dewatering fabric across a vacuum roll by a permeable extended nip belt press. Inside the belt press is a hot air hood that includes a steam shower to enhance moisture removal. The hot air hood apparatus over the belt press can be made more energy efficient by reusing a portion of heated exhaust air from the Yankee air cap or recirculating a portion of the exhaust air from the hot air apparatus itself (see U.S. Pat. No. 8,196,314). Further embodiments of the drying system composed of the hot air apparatus and steam shower in the belt press section are described in U.S. Pat. Nos. 8,402,673, 8,435,384 and 8,544,184.

After the belt press is a second press to nip the web between the structured fabric and dewatering felt by one hard and one soft roll. The press roll under the dewatering fabric can be supplied with vacuum to further assist water removal. This preferred belt press arrangement is described in U.S. Pat. Nos. 8,382,956, and 8,580,083, with FIG. 1 showing the arrangement. Rather than sending the web through a second press after the belt press, the web can travel through a boost dryer (FIG. 15 of U.S. Pat. Nos. 7,387,706 or 7,351,307), a high pressure through air dryer (FIG. 16 of U.S. Pat. No. 7,387,706 or 7,351,307), a two pass high pressure through air dryer (FIG. 17 of U.S. Pat. Nos. 7,387,706 or 7,351,307) or a vacuum box with hot air supply hood (FIG. 2 of U.S. Pat. No. 7,476,293). U.S. Pat. Nos. 7,510,631, 7,686,923, 7,931,781 8,075,739, and 8,092,652 further describe methods and systems for using a belt press and structured fabric to make tissue products each having variations in fabric designs, nip pressures, dwell times, etc. and are mentioned here for reference. A wire turning roll can also be utilized with vacuum before the sheet is transferred to a steam heated cylinder via a pressure roll nip (see FIG. 2a of U.S. Pat. No. 7,476,293).

The sheet is now transferred to a steam heated cylinder via a press element. The press element can be a through drilled (bored) pressure roll (FIG. 8 of U.S. Pat. No. 8,303,773), a through drilled (bored) and blind drilled (blind bored) pressure roll (FIG. 9 of U.S. Pat. No. 8,303,773), or a shoe press (U.S. Pat. No. 7,905,989). After the web leaves this press element to the steam heated cylinder, the % solids are in the range of 40-50%. The steam heated cylinder is coated with chemistry to aid in sticking the sheet to the cylinder at the press element nip and also aid in removal of the sheet at the doctor blade. The sheet is dried to up to 99% solids by the steam heated cylinder and installed hot air impingement hood over the cylinder. This drying process, the coating of the cylinder with chemistry, and the removal of the web with doctoring is explained in U.S. Pat. Nos. 7,582,187 and 7,905,989. The doctoring of the sheet off the Yankee, creping, is similar to that of TAD with only the knuckle sections of the web being creped. Thus the dominant surface topography is generated by the structured fabric, with the creping process having a much smaller effect on overall softness as compared to conventional dry crepe.

The web is now calendered (optional) slit, and reeled and ready for the converting process.

The ATMOS manufacturing technique is often described as a hybrid technology because it utilizes a structured fabric like the TAD process, but also utilizes energy efficient means to dewater the sheet like the Conventional Dry Crepe process. Other manufacturing techniques which employ the use of a structured fabric along with an energy efficient dewatering process are the ETAD process and NTT process. The ETAD process and products can be viewed in U.S. Pat. Nos. 7,339,378, 7,442,278, and 7,494,563. This process can utilize any type of former such as a Twin Wire Former or Crescent Former. After formation and initial drainage in the forming section, the web is transferred to a press fabric where it is conveyed across a suction vacuum roll for water removal, increasing web solids up to 25%. Then the web travels into a nip formed by a shoe press and backing/transfer roll for further water removal, increasing web solids up to 50%. At this nip, the web is transferred onto the transfer roll and then onto a structured fabric via a nip formed by the transfer roll and a creping roll. At this transfer point, speed differential can be utilized to facilitate fiber penetration into the structured fabric and build web caliper. The web then travels across a molding box to further enhance fiber penetration if needed. The web is then transferred to a Yankee dryer where it can be optionally dried with a hot air impingement hood, creped, calendared, and reeled. The NTT process and products can be viewed in international patent application publication WO 2009/061079 A1. The process has several embodiments, but the key step is the pressing of the web in a nip formed between a structured fabric and press felt. The web contacting surface of the structured fabric is a non-woven material with a three dimensional structured surface comprised of elevations and depressions of a predetermined size and depth. As the web is passed through this nip, the web is formed into the depression of the structured fabric since the press fabric is flexible and will reach down into all of the depressions during the pressing process. When the felt reaches the bottom of the depression, hydraulic force is built up which forces water from the web and into the press felt. To limit compaction of the web, the press rolls will have a long nip width which can be accomplished if one of the rolls is a shoe press. After pressing, the web travels with the structured fabric to a nip with the Yankee dryer, where the sheet is optionally dried with a hot air impingement hood, creped, calendared, and reeled.

As shown in the aforementioned discussion of tissue papermaking technologies, the fabrics utilized are critical in development of the tissue web's structure and topography which are instrumental in the quality characteristics of the web such as softness (bulk softness and surfaces smoothness) and strength (tensile). The manufacturing process for making these fabrics has been limited to weaving a fabric (primarily forming fabrics and imprinting/structured fabrics) or a base structure upon which synthetic fibers are needled (press fabrics) or overlaid with a polymeric resin (overlaid imprinting/structured fabrics). The manufacturing method of an imprinting fabric is similar to a forming fabric (see U.S. Pat. Nos. 3,473,576, 3,573,164, 3,905,863, 3,974,025, and 4,191,609 for examples) except for an additional step if an overlaid polymer is utilized. These type of fabrics are disclosed in U.S. Pat. Nos. 5,679,222, 4,514,345, 5,334,289, 4,528,239 and 4,637,859. These sets of patents are assigned to the Procter and Gamble company and show how to produce a fabric with a patterned resin applied over a woven substrate. The patterned resin completely penetrates the woven substrate in the applied areas and the top surface of the patterned resin is flat with a 90 degree angle used as the resin approaches and penetrates the woven fabric. There is a second technique used to apply an overlaid resin to a woven imprinting fabric (see U.S. Pat. Nos. 6,610,173, 6,660,362, 6,998,017, and European Patent # EP 1 339 915). These patents are assigned to Kimberly-Clark, but have been purchased by First Quality Tissue. The main difference is the overlaid polymer has asymmetrical cross sectional profile in at least one of the machine direction and a cross direction and at least one nonlinear side relative to the vertical axis. The top portion of the overlaid resin can be a variety of shapes and not simply a flat structure as shown in the Procter patents. The sides of the overlaid resin as the resin approaches and then penetrates the woven structure can also take different forms, not a simple linear path 90 degrees relative the vertical axis of the fabric. Both methods result in a patterned resin applied over a woven substrate. The benefit is that resulting patterns are not limited by a woven structure and can be created in any desired shape to enable a higher level of control of the web structure and topography that dictate web quality properties.

Another newer manufacturing method for producing structuring or imprinting fabrics can be viewed in Patent No. U.S. Pat. No. 8,980,062 and patent application No. US 2010/0236034. The process involves spirally winding strips of polymeric material, such as industrial strapping or ribbon material, and adjoining the sides of the strips of material using ultrasonic, infrared, or laser welding techniques to produce an endless belt. Optionally, a filler or gap material can be placed between the strips of material and melted using the aforementioned welding techniques to join the strips of materials. The strips of polymeric material are produced by an extrusion process from any polymeric resin such as polyester, polyamide, polyurethane, polypropylene, or polyether ether ketone resins. The strip material can also be reinforced by incorporating monofilaments of polymeric material into the strips during the extrusion process or by laminating a layer of woven polymer monofilaments to the non-sheet contacting surface of a finished endless belt composed of welded strip material. The endless belt can have a textured surface produced using processes such as sanding, graving, embossing, or etching. The belt can be impermeable to air and water, or made permeable by processes such as punching, drilling, or laser drilling. Examples of structuring belts used in the NTT process can be viewed in International Publication Number WO 2009/067079 A1 and US 2010/0065234 A1. There is a continuing need for manufacturing processes for making papermaking belts.

SUMMARY OF THE INVENTION

An object of the present invention is to provide a manufacturing process for creating endless belts used in papermaking processes where the belts use dimensional printing technology (3D-printing) in which polymers of specific material properties (such as heat and moisture stability) are laid down in an additive manner under computer control to create belts with unique structural and topographical profiles.

A method of forming an endless belt of a papermaking machine according to an exemplary embodiment of the present invention comprises: printing polymeric material on a print medium along a print direction in a series of printing steps, with the polymeric material being printed a predetermined distance along the print direction in each printing step; and after each printing step, indexing the print medium in a cross direction that is transverse to the print direction, wherein the print medium provides an endless surface so that the printing of the polymeric material results in at least one layer of polymeric material that forms the endless belt.

In an exemplary embodiment, the at least one layer is seamless.

In an exemplary embodiment, the printing of the polymeric material results in two or more layers of polymeric material that form the endless belt.

In an exemplary embodiment, the print medium is an outer surface of a cylinder.

In an exemplary embodiment, the print medium is a conveyor belt.

In an exemplary embodiment, the method further comprises the step of providing a substrate on the conveyor belt prior to printing the polymeric material.

In an exemplary embodiment, the substrate is a woven polymer structure.

In an exemplary embodiment, the substrate is an extruded flat netting polymer.

In an exemplary embodiment, the method further comprises the step of laminating the substrate with the printed polymeric material.

In an exemplary embodiment, the step of laminating comprises ultrasonic lamination.

In an exemplary embodiment, the method further comprises the step of curing the polymer before each indexing step.

DETAILED DESCRIPTION

Figure 1:
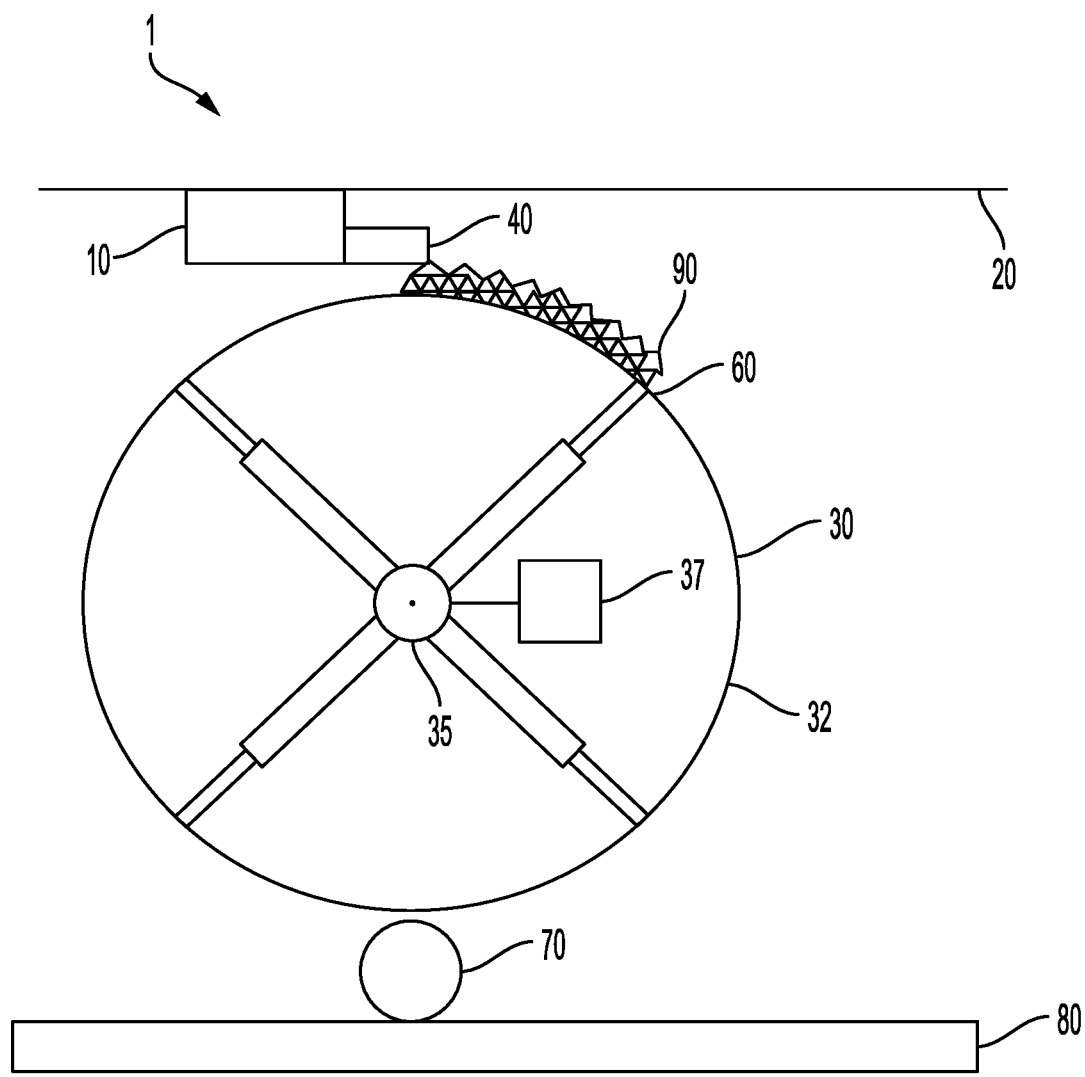
FIG. 1 is a representative diagram showing a side view of an apparatus for forming an endless belt according to an exemplary embodiment of the present invention.

The present invention is directed to a process of using three dimensional printing technology (3D-printing) to produce endless belts intended for use in tissue paper production. The process involves laying down polymers of specific material properties in an additive manner under computer control to create belts with unique structural and topographical profiles. One specific material property is stability. The belts made from the inventive process may be utilized in a papermaking environment, where they are subjected to heat and moisture. Polymeric materials useful in the present invention are stable when exposed to temperature up to 110° C. The materials may also be stable under a hot and moist environment. One way to test for this stability is to store the material in an autoclave for 2 weeks at 110° C. When removed from the autoclave, if laminated, the polymeric materials should not readily peel away from the substrate they are laminated to. They should also not demonstrate signs of degradation.

3D printing is widely use in the automotive industry, engineering, art, architecture and even in research for creating components requiring high level of precision. As conventionally known, the process involves the use of CAD software to generate a model, which is then transferred to process preparation software where the model is virtually disassembled into individual layers. Molds are placed in a virtual build space, and the building process is started. The loose basic material is evenly applied over the entire build width. A print head applies binder where the model is to be produced, whereby the binder infiltrates the recently applied layer and connects it with the layer below. The building platform is lowered and the process starts again. Following the completion of the building process, the loose particle material is removed manually. Once the molds have been cleaned, they can be mounted and prepared for casting.

Current methods for manufacturing papermaking fabrics lack versatility and are limited in their scope. In the current invention, papermaking fabrics are manufactured using any 3D printing techniques and the materials that can be utilized with these 3D printers. This process can be used to manufacture any papermaking fabrics including but not limited to forming, press, belt press, imprinting/structured fabrics, dryer fabrics, sheet support fabrics, or belt press fabric. The main 3D printing techniques include Fused Deposition Modeling™ (commonly known as fused filament fabrication) and PolyJet Technolgy (Stratasys Ltd, Eden Prairie, Minn., USA) which is described below in detail, but other methods such as Selective Laser Melting (SLM), Direct Metal Laser Sintering (DMLS), Selective Laser Sintering (SLS), Stereolithography (SLA), or Laminated Object Manufacturing (LOM) can be utilized. The 3-D printed belts can be fully printed, or printed on top of a substrate such as a polyethylene terephthalate woven structure (such as a woven through air dried belt) or extruded flat polymer netting. Use of a substrate can enhance the strength and dimensional stability of finished fabric. When utilizing a woven substrate, sanding is preferred to achieve a more planar surface for subsequent 3-D printing. Extruded flat netting is preferred as the substrate is largely planar and uniform in thickness. The various materials that can be utilized on these printers are also described below.

Fused Deposition Modeling™ (FDM) builds concept models, functional prototypes and end-use parts in standard, engineering-grade and high-performance thermoplastics. 3D printers that run on FDM Technology build parts layer-by-layer by heating thermoplastic material to a semi-liquid state and extruding it according to computer-controlled paths. Thermoplastic filament feeds through a heated head and exits, under high pressure, as a fine thread of semi-molten plastic. In a heated chamber, this extrusion process lays down a continuous bead of plastic to form a layer. This layering process repeats to manufacture thermoplastic parts. FDM uses two materials to execute a print job: modeling material, which constitutes the finished piece, and support material, which acts as scaffolding. Material filaments are fed from the 3D printer's material bays to the print head, which moves in X and Y coordinates, depositing material to complete each layer before the base moves down the Z axis and the next layer begins. Once the 3D printer is done building, the user breaks the support material away or dissolves it in detergent and water, and the part is ready to use. The benefits of FDM are: simple-to-use, office-friendly 3D printing process. Thermoplastic parts can endure exposure to heat, chemicals, humid or dry environments, and mechanical stress. Soluble support materials make it possible to produce complex geometries and cavities that would be difficult to build with traditional manufacturing methods.

PolyJet 3D printing is similar to inkjet document printing, but instead of jetting drops of ink onto paper, PolyJet 3D printers jet layers of liquid photopolymer onto a build tray and cure them with UV light. A carriage—with four or more inkjet heads and ultraviolet (UV) lamps—traverses the work space, depositing tiny droplets of photopolymers, materials that solidify when exposed to UV light. After printing a thin layer of material, the process repeats until a complete 3D object is formed. Fully cured models can be handled and used immediately, without additional post-curing. Along with the selected model materials, the 3D printer also jets a gel-like support material specially designed to uphold overhangs and complicated geometries. It is easily removed by hand and with water. PolyJet 3D printing technology has many advantages for rapid prototyping, including superior quality and speed, high precision, and a very wide variety of materials. The benefits of PolyJet technology create precision prototypes that set the standard for finished-product realism. It's very thin print layers make complex shapes, fine details and smooth finished surfaces possible.

PolyJet offers product realism across a wide band of requirements. There are over 450 options offering a range of hues, transparency, strength, rigidity and flexibility. For FDM material options range from the commonly used plastic to the highly advanced resin. Material options include: anti-static, FST rating (flame, smoke and toxicity), chemical resistance and very high temperature resistance. Both FDM and PolyJet offer bio-compatible materials with USP Plastic Class VI to ISO 10993 ratings.

FIG. 1. illustrates a side view of an apparatus, generally designated by reference number 1, for producing an endless belt using 3-D printing technology according to an exemplary embodiment of the present invention. The apparatus 1 includes a print head 10, a print space 30 and a UV light source 40 mounted on the print head 10. The print head 10 is mounted to an overhead bridge crane 20 or other structure that allows for movement of the print head across the print space 30. The print space 30 in this exemplary embodiment is a hollow cylinder with an aluminum surface, although it should be appreciated that the print space 30 may have any other suitable configuration, such as, for example, an endless loop made of a solid, semi-solid or liquid material.

The print space 30 in this exemplary embodiment is made up of a cylinder 32 having an outer surface that provides a platform on which the printing may occur. The cylinder 32 includes a support structure 35 made up of frame components (rods, beams, etc.) that maintain the shape of and provide structural strength to the cylinder 32. The support structure 35 may be made of materials such as, for example, steel or aluminum. As explained in more detail below, the cylinder 32 is indexed a predetermined distance during a printing process so as to print material across the outer surface of the cylinder 32. In this regard, the cylinder 32 is preferably indexed using a highly precise drive system 37 such as a servo drive system that uses servo motion control, including components such as an electric motor, a drive, a controller, and a feedback device (e.g., an encoder). The drive system 37 is preferably operatively connected to the support structure 35 inside the hollow cylinder 32.

During a printing operation, the print head 10 traverses the width of the print space 30 in a print direction, layering down support material/scaffolding until the full width or a pre-set partial width covered by the print head 10 is completed. The predetermined distance may range from about 5 mm to about 20 mm. The print space 30 is then indexed in a cross direction, transverse to the print direction. In this case, since the print space 30 is a hollow cylinder, the hollow cylinder is indexed clockwise (or counter-clockwise, depending on the configuration of the apparatus 1 and/or the desired printing direction) at a precise distance of from about 5 mm to about 20 mm. The printed polymeric material may require curing. Suitable curing methods include the use of cooling, laser or ultraviolet ("UV") light. If UV curing is required, such as in PolyJet printing, the UV light source 40 is activated to cure the polymer before indexing. The printing, curing, and indexing of the print space continues until the support material and modeling material is completed.

The print head 10 may include multiple heads in order to print layers of support material 60 made up of FDM polymers, PolyJet polymers, or a combination of each. Each layer may be roughly 0.01 mm thick, in which case 100 full revolutions of the print space 30 would be required to produce an endless belt of 1 mm in thickness. With the precision movement allowed for by the drive system 37, the two ends of each layer of laid down material can be connected using the print head 10 with no seaming needed. In this regard, the two ends of each layer may be precisely aligned with one another so as to be in contact with one another but not overlapping, so that no seam is formed. The support material 60 bonds well with the aluminum outer surface 32 of the hollow cylinder and thus withstands the pull of gravity to keep the fabric on the print space 30 as the cylinder is indexed.

Once the belt/fabric is completed, a full width shower 70, which is mounted below the print space 30, is utilized to remove the support material. The support material is then contained in a tank 80 for later disposal. With the support material removed, the finished belt 90 can be removed by hand with appropriate access catwalks installed, or by using the overhead crane 20 with slings and appropriate clamping devices to the fabric.

In exemplary embodiments the print space 30 may be removed and replaced with another print space that has a different diameter and/or width, or otherwise a different sizing and/or configuration. In this regard, the support frame 35 inside the cylinder may be adjustable to accommodate various size print spaces. The position of the print head 10 may also be adjustable to maintain the proper gap to surface of the print space 30 or as the printed fabric increases in thickness as each layer of material is added and cured.

Figure 2:
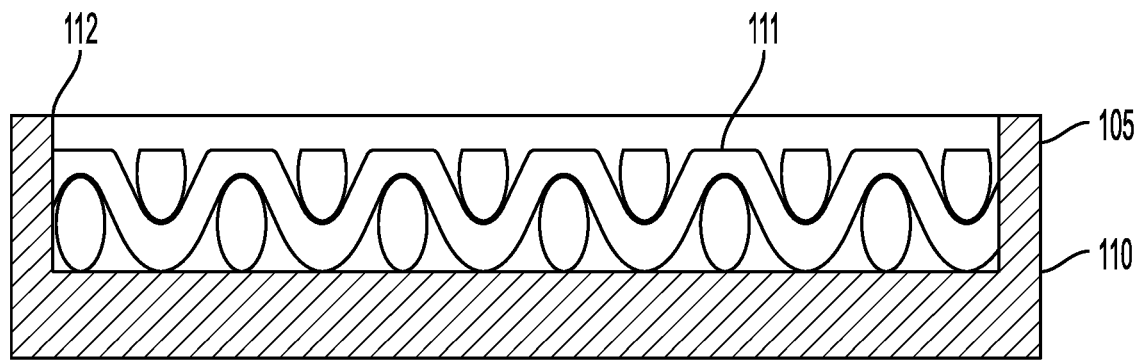
FIG. 2 is a cross sectional view of a conveyor belt according to an exemplary embodiment of the present invention.
Figure 3:
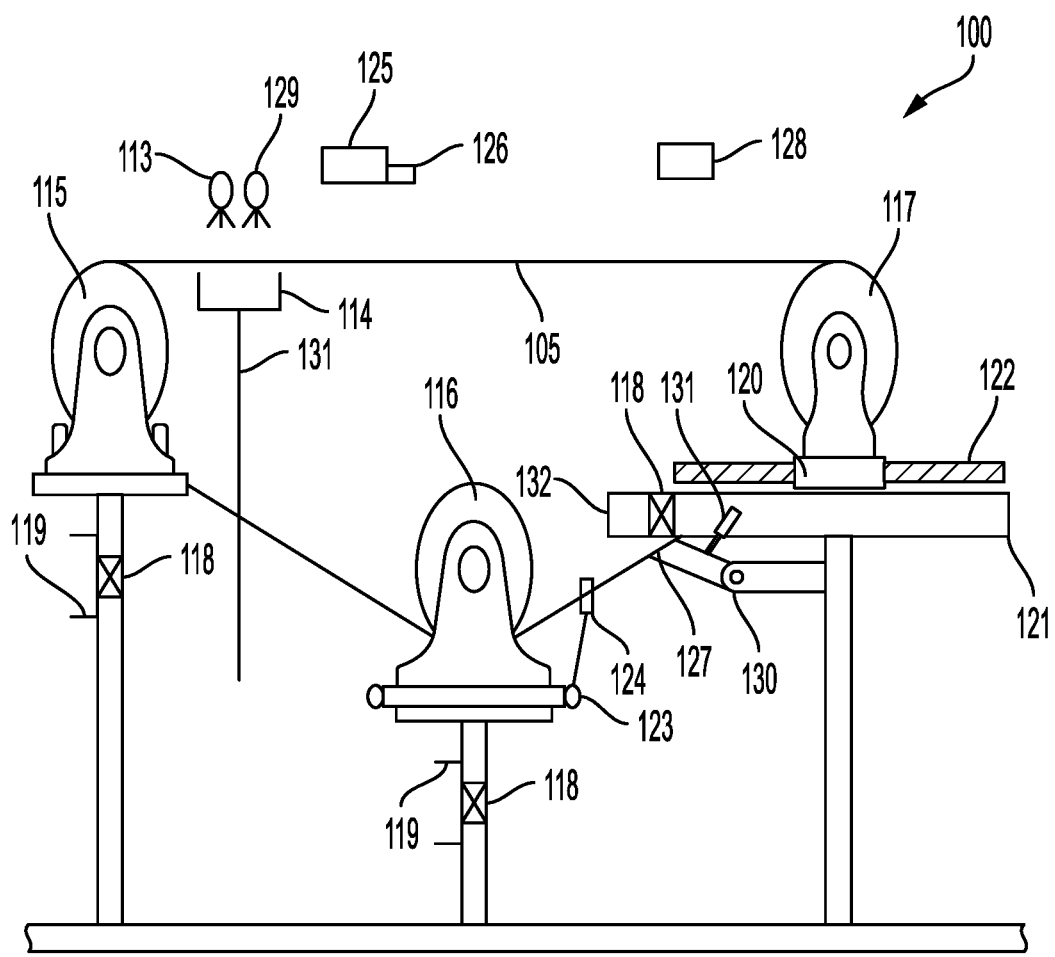
FIG. 3 is a representative diagram showing a side view of an apparatus for forming an endless belt according to an exemplary embodiment of the present invention.

FIG. 3 illustrates a side view of an apparatus, generally designated by reference number 100, for producing an endless belt using 3-D printing technology according to an exemplary embodiment of the present invention. In this embodiment, a woven or extruded polymer is utilized as a substrate for printing in order to enhance the strength and dimensional stability of the finished belt. The apparatus 100 includes a conveyor belt 105 that holds and conveys the substrate. As shown in FIG. 2, the conveyer belt 105 has raised edges 110 to hold the substrate (indicated by reference number 111 in FIG. 2). The substrate 111 may be a woven polymer structure that is sanded (as shown), extruded flat netting polymer, or another suitable substrate. The raised edges 110 of the conveyer belt 105 are the same or nearly the same height as the thickness of the substrate 111 in order to allow for gel or water to fill any void volume in the substrate 111 and create a truly planar surface suitable for printing. The water or gel level is shown as a dashed line 112.

The apparatus as shown in FIG. 3 can utilize a low pressure sprayboom 113 to inject the water or gel, with any overflow from the raised edges of the conveyer belt captured in a pan 114 with a drain 131. The conveyer belt 105 with the substrate 111 are installed onto the apparatus 100 which contains a drive or indexing roll 115, a guide roll 116 and a tension roll 117. To facilitate installation of the conveyer belt 105 and substrate 111, the framework of the apparatus 105 may be cantilevered with removable blocks 118. To facilitate removal of the blocks 118, welded plates 119 to the machine frame may be provided to allow for use of a hydraulic jack to support the load of the apparatus 100 as the blocks 118 are removed. Once the blocks 118 are removed, the cantilever system is engaged and the jacks can be removed and conveyer belt 105 with substrate 111 installed. In order to make the installation easier, the tension roll 117 is preferably unbolted, moved with slings using an overhead crane and bolted to the framework at location 132 in order to provide the conveyer belt 105 and substrate 111 with sufficient slack. After installation the tension roll 117 can be moved back into place with the crane. In an exemplary embodiment, the tension roll 117 is mounted to a block 120 with dove tails, that can travel in a machine frame 121 with dove tail grooves using a tensioning mechanism 122. The tensioning mechanism 122 is composed of an air motor that drives a cross-shaft connected to a screw jack on each side of the tension roll. A suitable tensioning mechanism is supplied by Weingrill Via VALPELLICE, 63 ITALIA, 10060 S. Secondo di Pinerolo (TO), Italia+39 0121 501 855. A suitable guide mechanism is supplied by Sinclair International, 85 Boulevard Queensbury, N.Y. 12804, USA 800-345-2023. The design uses frictionless diaphragm air actuators 123 and a guide palm 124.

The drive roll 115 is preferably indexed using a highly precise drive system such as a servo drive system that uses servo motion control, including components such as an electric motor, a drive, a controller, and a feedback device (e.g., an encoder). A print head 125 is mounted to an overhead bridge crane or other structure that allows for movement of the print head 125 across the print space (in this case, the conveyer belt 105 and substrate 111) in a print direction, layering down support material/scaffolding until the full width or a pre-set partial width covered by the print head 125 is completed. Then the print space is indexed clockwise (or counter-clockwise, depending on the configuration of the apparatus 100 and/or the desired printing direction) at a precise distance in a cross direction, transverse to the print direction. If UV curing is required, such as in PolyJet printing, a UV light source 126, mounted on the print head 125, may be used to cure the polymer before indexing. The printing, curing, and indexing of the print space continues until the support material and modeling material is completed.

With the precision movement allowed for by the drive system, the two ends of each layer of laid down material can be connected using the print head 125 with no seaming needed. In this regard, the two ends of each layer may be precisely aligned with one another so as to be in contact with one another but not overlapping, so that no seam is formed. The forces of attraction between 3-D printed material and the water layer between the material and the substrate 105 are strong enough to hold the material to the substrate 105 as the print space is indexed to create the first layer of an endless printed belt. In an exemplary embodiment, each layer is approximately 0.01 mm thick and the print space completes roughly 50 to 100 revolutions in order to produce a 0.5 to 1.0 mm thick printed belt.

Once the belt/fabric is completed, a high pressure full width shower 129, mounted above the print space, is utilized to remove the support material. With the support material removed, the belt can be dried using a vacuum box 127. The vacuum box 127 is raised into position on pivot arms controlled using an air cylinder 131 on both ends of the box. Once dried, the 3-D printed belt is laminated to the substrate using an ultrasonic horn 128 mounted above the fabric. The horn 128 can be mounted to the same bridge crane as the print head 125 and is able to traverse the width of the fabric. The print space is indexed until the print space completes a full rotation and the 3-D printed belt is completely laminated to the substrate. The ultrasonic horn 128 is adjustable to maintain a proper gap between the horn 128 and the 3-D printed belt. Other suitable methods for laminating include the use of an adhesive, solvent bonding, laser bonding and combinations thereof. With the belt fully laminated to the substrate, it can then be removed by hand with appropriate access catwalks installed, or by using the overhead crane with slings and appropriate clamping devices to the fabric/belt.

Figure 4:
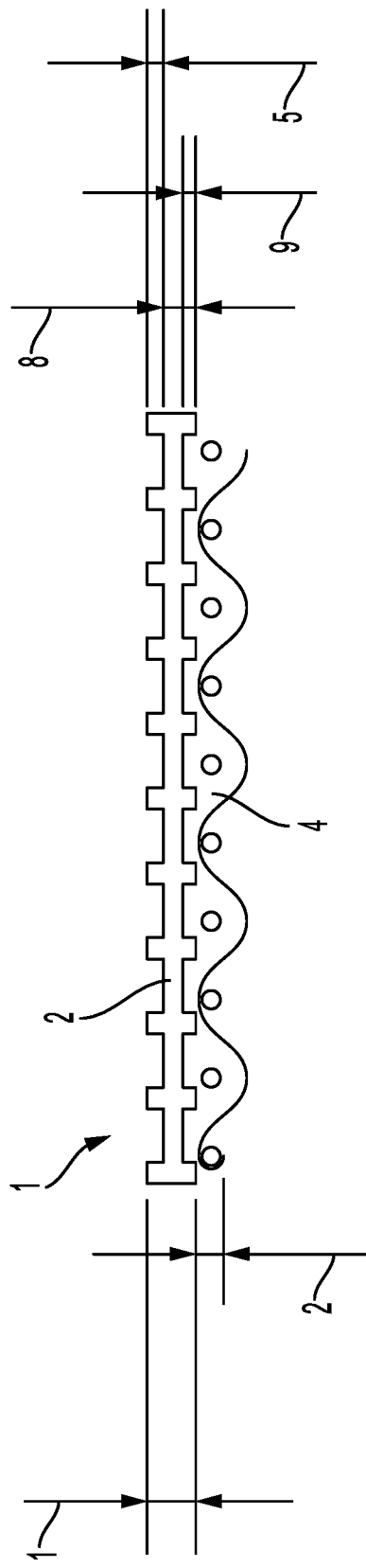
FIG. 4 is a cross-sectional view of a belt or fabric according to an exemplary embodiment of the present invention.
Figure 5:
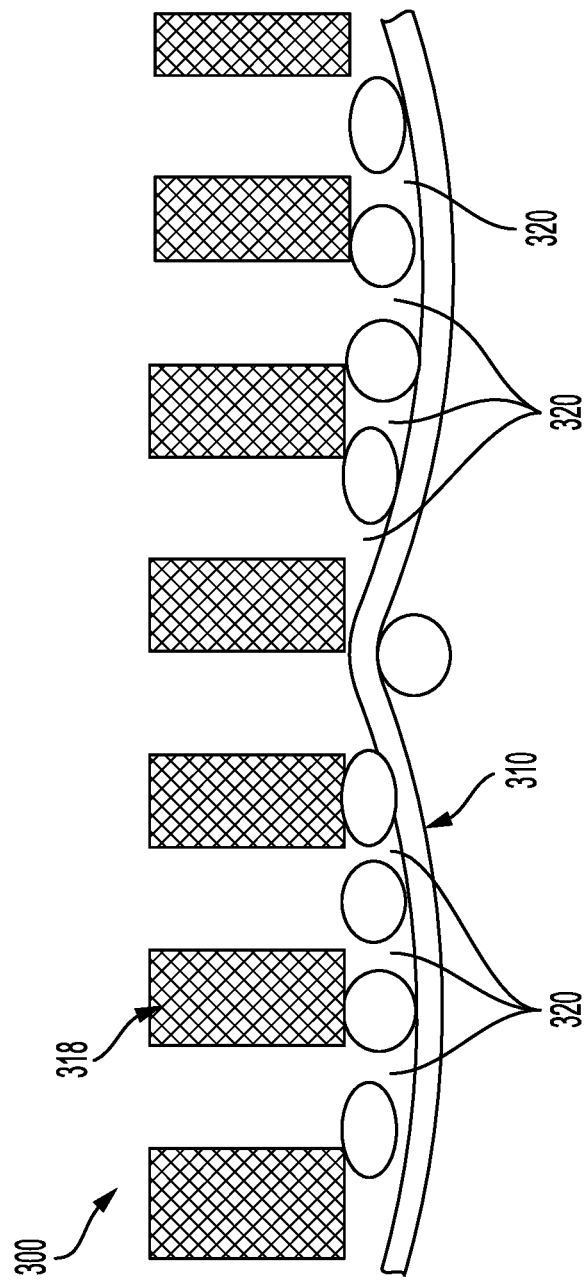
FIG. 5 is a cross-sectional view of a belt or fabric according to an exemplary embodiment of the present invention.

In exemplary embodiments, the 3-D printing processes described herein may be used to form endless belts that have air pockets in the X,Y, and Z directions. In this regard, FIG. 4 is a cross-sectional view and FIG. 5 is another cross sectional view of a belt or fabric, generally designated by reference number 300, according to an exemplary embodiment of the present invention. The belt or fabric 300 is produced by laminating a printed and cured polymer layer 318 to a woven layer 310. The polymer layer 318 includes CD aligned elements 314 and MD aligned elements 312. The CD aligned elements 314 and the MD aligned elements 312 cross one another with spaces between adjacent elements so as to form openings. Both the polymer layer 318 and woven layer 310 have non-planar, irregularly shaped surfaces that when laminated together only bond together where the two layers come into direct contact. The lamination results in the polymer layer 318 extending only partially into the woven layer 310 so that any bonding that takes place between the two layers occurs at or near the surface of the woven layer 310. In a preferred embodiment, the extruded polymer layer 318 extends into the woven layer 310 to a depth of 30 microns or less. As shown in FIG. 4, the partial and uneven bonding between the two layers results in formation of air channels 320 that extend in the X-Y plane of the fabric or belt 300. This in turn allows air to travel in the X-Y plane along a sheet (as well as within the fabric or belt 300) being held by the fabric or belt 300 during TAD, UCTAD, or ATMOS processes. Without being bound by theory, it is believed that the fabric or belt 300 removes higher amounts of water due to the longer airflow path and dwell time as compared to conventional designs. In particular, previously known woven and overlaid fabric designs create channels where airflow is restricted in movement in regards to the X-Y direction and channeled in the Z-direction by the physical restrictions imposed by pockets formed by the monofilaments or polymers of the belt. The inventive design allows for airflow in the X-Y direction, such that air can move parallel through the belt and web across multiple pocket boundaries and increase contact time of the airflow within the web to remove additional water. This allows for the use of belts with lower permeability compared to conventional fabrics without increasing the energy demand per ton of paper dried. The air flow in the X-Y plane also reduces high velocity air flow in the Z-direction as the sheet and fabric pass across the molding box, thereby reducing the formation of pin holes in the sheet.

Now that the preferred embodiments of the present invention have been shown and described in detail, various modifications and improvements thereon will become readily apparent to those skilled in the art. Accordingly, the spirit and scope of the present invention is to be construed broadly and not limited by the foregoing specification.

The invention claimed is:

1. A method of forming an endless belt of a papermaking machine, comprising:

printing polymeric material onto a print medium along a print direction in a series of printing steps, with the polymeric material being printed a predetermined distance along the print direction in each printing step; and after each printing step, indexing the print medium in a cross direction that is transverse to the print direction, wherein the print medium provides an endless surface so that the printing of the polymeric material results in at least one layer of polymeric material that forms the endless belt, wherein the printing results in all elements of the endless belt forming a unitary structure, wherein the print medium is a conveyor belt, and the method further comprises:

providing a substrate on the conveyor belt prior to printing the polymeric material; and laminating the substrate with the printed polymeric material, wherein the step of laminating comprises a method selected from the group consisting of the use of adhesive, solvent bonding, laser bonding, ultrasonic lamination and combinations thereof.

2. The method of claim 1, wherein the at least one layer is seamless.

3. The method of claim 1, wherein the printing of the polymeric material results in two or more layers of polymeric material that form the endless belt.

4. The method of claim 1, further comprising curing the polymer before each indexing step.

5. The method of claim 1, wherein the substrate is a woven polymer structure.

6. The method of claim 1, wherein the substrate is an extruded flat netting polymer.

* * * * *